INVENTOR.
JACK "E" WILCOX
BY
Robert D. Sanborn
ATTORNEY

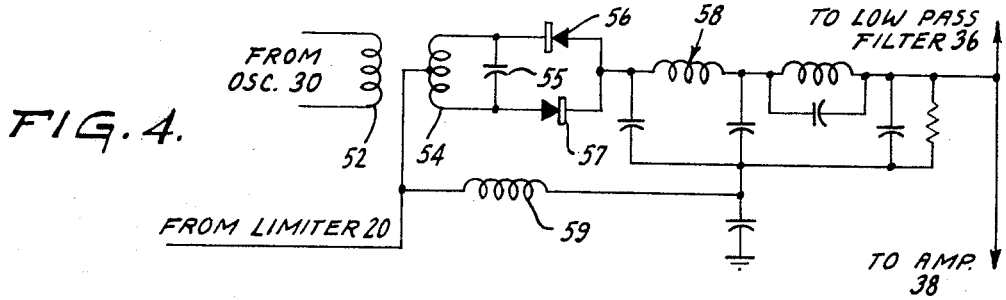
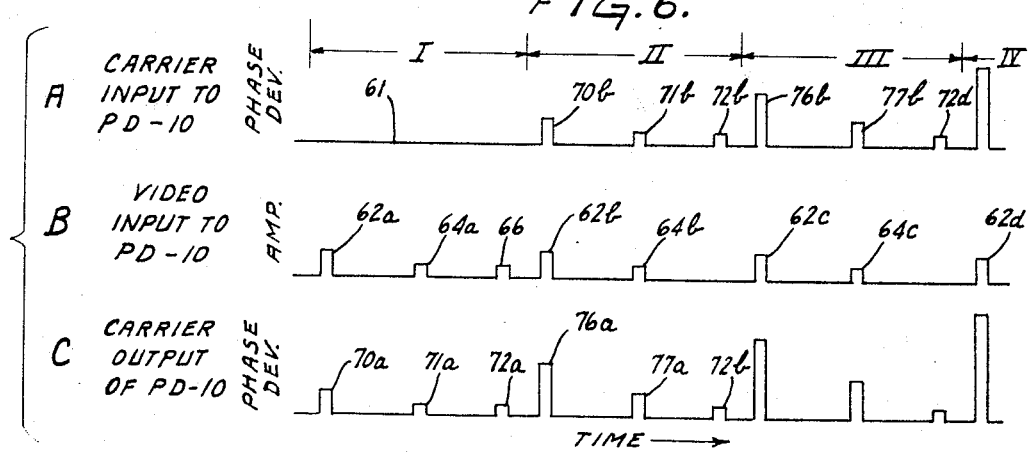
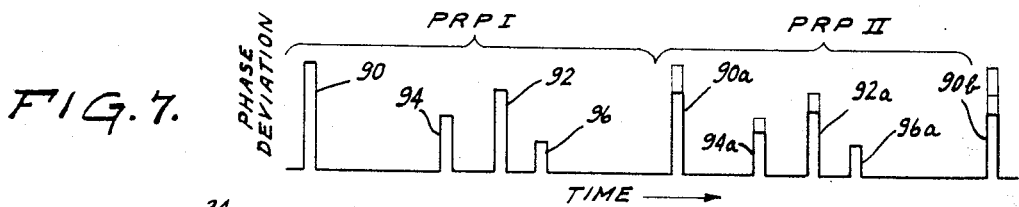
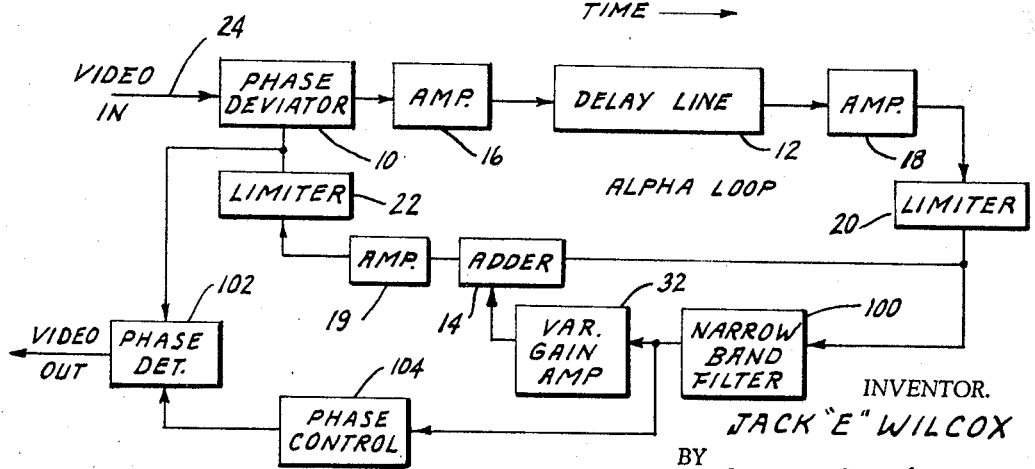

United States Patent Office 3,448,451
Patented June 3, 1969

3,448,451
RADAR SWEEP INTEGRATOR CIRCUIT
Jack "E" Wilcox, Levittown, Pa., assignor, by mesne assignments, to Philco-Ford Corporation, Philadelphia, Pa., a corporation of Delaware
Filed June 25, 1959, Ser. No. 822,965
Int. Cl. G01s 7/28; H03b 1/00; H04b 1/10
U.S. Cl. 343—17.1   10 Claims

SIGNAL INTEGRATING SYSTEM

This invention relates to signal integrating systems and more particularly to systems for integrating signals containing periodically recurring pulse series.

In a radar system, the video signal which represents target-reflected echo signals consists of one or more series of pulses which recur periodically at the repetition frequency of the radar system. Each series represents a particular target. Superimposed on these series of pulses which represent target-reflected echo signals are random signals resulting from ground or sea clutter and noise signals generated within the receiver of the radar system. These random clutter signals makes it difficult if not impossible to detect small video pulses representing weak target echo signals.

Integrator circuits, commonly called "sweep integrators," have been developed for improving the signal-to-noise and the signal-to-clutter ratio of a radar system. While sweep integrators were first developed for use with radar systems they may be employed to improve the signal-to-noise ratio of any signal which includes periodically recurring intelligence. Basically a sweep integrator comprises a memory circuit, such as an ultrasonic delay line, with a controlled feedback circuit coupling the output of the memory circuit to the input thereof, thereby to form a recirculating signal loop. The delay time of the memory circuit is chosen to be equal to the radar pulse repetition period. Radar video signals are introduced into the recirculating signal loop as they are received. They are combined in the loop with previously introduced radar video signals. An output signal proportional in amplitude to a selected characteristic of the combined signal is derived from the recirculating loop. Sweep integrators operate on the principle that the frequency distribution of a recurrent series of pulses is a line spectrum with lines located at harmonics of the pulse repetition frequency, whereas the spectrum of random noise and certain types of clutter signals is more or less uniformly distributed over the entire passband. The sweep integrator is so constructed and arranged that the periodic video pulses representing echoes from targets add linearly in the recirculating loop while a periodic signals resulting from clutter, thermal noise, etc. add in the more gradual root mean square manner. As a result, the signal-to-noise and/or clutter ratio in the recirculating loop is greater than the corresponding ratio for the unintegrated signal. The degree of improvement of the signal-to-noise and/or clutter ratio is a function of the number of successive series stored as a sum in the recirculating loop. In a typical application of the sweep integrator it may be desirable to store with appreciable strength the sum of as many as 50 to 100 successive series within the recirculating loop.

One type of sweep integrator now in use includes a recirculating signal loop formed of a delay line having a delay time approximately equal to the repetition period of the pulses to be stored and amplifiers and limiters coupling the output of the delay line to the input thereof. The total delay of the loop is usually exactly equal to the pulse repetition period. The delay line has a delay time equal to the total loop delay minus the minor delays which occur in the amplifiers, limiters, etc. which complete the loop.

Preferably the pulse series are stored in the recirculating signal loop as momentary phase deviations or frequency deviations of the average carrier wave circulating in the loop. This carrier wave may be generated by self-oscillation of the loop or it may be supplied by suitable cicuits associated with the loop. The carrier wave may be heterodyned up or down in frequency at various points in the loop without affecting the over-all operation of the system. The phase deviation or frequency deviation is accomplished by including in the recirculating signal loop a deviator circuit which is responsive to the signal to be integrated. This deviator circuit introduces momentary phase or frequency deviations in the carrier wave passing therethrough at the instant an input signal is supplied. If successive series of pulses are to be stored with an exponential memory, it is necessary that the intelligence feedback factor have a value less than one. That is, a phase deviation introduced at one point in the loop must be reduced to less than its original value by the time the carrier wave impressed with that deviation next reaches the same point in the loop. The intelligence feedback factor will approach the value one as the number of series to be stored increases but must average less than one if the system is to be stable or non-oscillatory. If 50 to 100 pulse series are to be stored, an intelligence feedback factor of from .98 to .99 is required.

In the past an intelligence feedback factor of less than one has been achieved by employing a main recirculating loop, generally known as the alpha loop, having an amplitude feedback factor and an intelligence feedback factor of unity and a low gain degenerative loop coupled thereto for reducing the effective intelligence feedback factor to a value slightly less than unity. This degenerative loop is usually designated the beta loop. In general, the degenerative loop comprises means for detecting the phase or frequency modulation present on the recirculating carrier wave and means for combining the detected signal in a degenerative sense with the input signal to the phase or frequency deviator in the main recirculating loop. Since the beta loop must pass the detected video pulses without distortion, it must have a bandwidth which is at least as wide as the video bandwidth of the signal to be integrated. It must have a linear response characteristic since nonlinearities introduced by the beta loop may be exaggerated by the integrating properties of the main recirculating loop. Therefore the use of a second signal loop to degenerate the main alpha loop is undesirable both from the standpoint of the extra circuitry required and from the standpoint of the distortion of the stored intelligence which may result from nonlinearities in the beta loop.

In many instances it is desirable to vary the over-all intelligence feedback factor of the sweep integrator. In the double loop type of sweep integrator just described, the intelligence feedback factor is changed by changing the gain of the beta loop. This is made difficult by the fact that the necessarily wide bandwidth of the beta loop couples to the alpha loop any unwanted harmonics that may be generated by the nonlinear amplifier characteristic usually present in variable gain amplifiers.

Therefore it is an object of the present invention to provide an improved sweep integrator which does not require a wide band degenerative loop.

Still another object of the present invention is to provide a sweep integrator in which the over-all intelligence feedback factor may be controlled without demodulating the recirculating carrier wave.

A further object of the present invention is to provide a sweep integrator which is so arranged that the over-all intelligence feedback factor may be readily varied.

An additional object of the present invention is to provide a sweep integrator in which the effects of nonlinearities in the intelligence feedback factor control circuit are minimized.

Still another object of the present invention is to provide a sweep integrator circuit which is less complex than the double loop sweep integrators of the prior art.

A further object of the invention is to provide a sweep integrator which has an improved means for controlling the carrier frequency of the alpha loop.

In general, these and other objects of the invention are achieved by providing a recirculating loop in which information is stored as phase shifts of the recirculating carrier wave. The recirculating signal loop per se has an over-all intelligence feedback factor of unity. The intelligence feedback factor is reduced to a value less than unity by linearly adding to the modulated carrier wave in the recirculating loop an unmodulated carrier wave which is in phase with the reference phase of the recirculating carrier wave at the point of addition.

For a better understanding of the present invention together with other and further objects thereof, reference should now be made to the following detailed description which is to be read in conjunction with the accompanying drawings in which:

FIG. 4 is a partial schematic of the phase detector circuit of FIG. 1;

FIG. 6 is a series of waveforms which further illustrate the operation of the system of FIG. 1;

FIG. 7 is a plot which shows the time versus phase relationship for a signal stored in the system shown in FIG. 1;

FIG. 8 is a block diagram similar to FIG. 1 showing an alternative means for adding a reference phase carrier wave to the recirculating loop.

Figure 1:
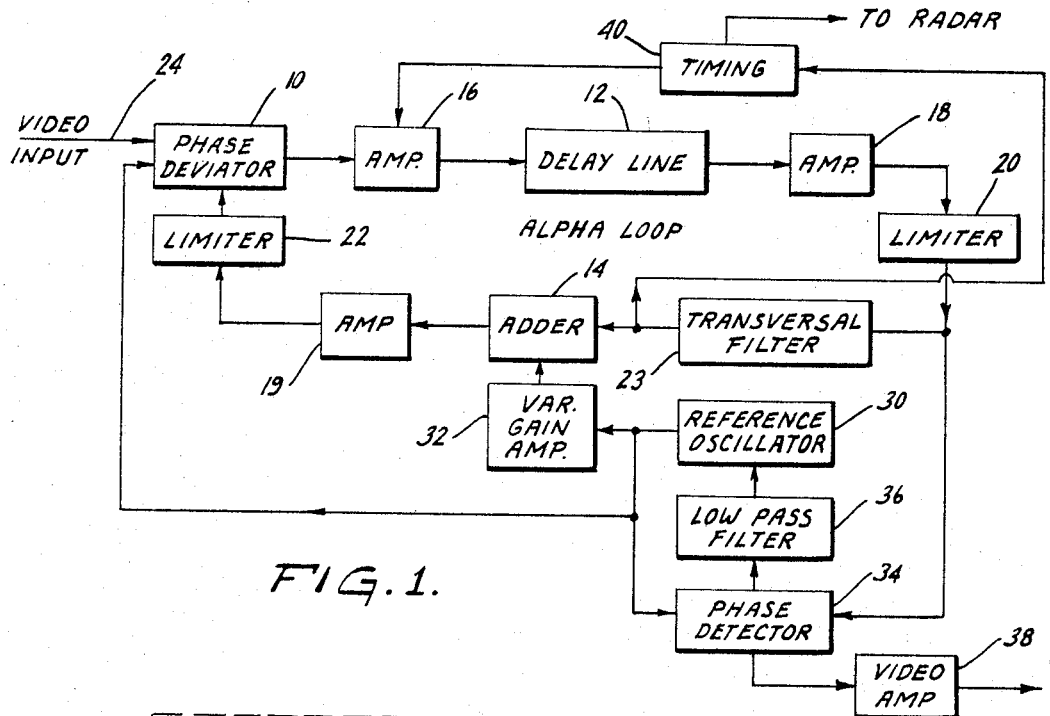
FIG. 1 is a block diagram of one preferred embodiment of the present invention.

In the embodiment shown in FIG. 1 the recirculating loop includes a phase deviator 10, a delay line 12 and an adder circuit 14. This loop is hereinafter referred to as the alpha loop. Delay line 12 is preferably an electroacoustical delay line having a delay time approximately equal to the desired pulse repetition period of the associated radar system. Means must be provided in the recirculating loop for compensating for signal attenuation through delay line 12, phase deviator 10 and adder circuit 14. The necessary amplification may be incorporated in phase deviator 10 and adder circuit 14. However, in the system shown in FIG. 1, this amplification is provided by amplifier 16 which precedes delay line 12, an amplifier 18 which follows delay line 12 and a third amplifier 19 which follows adder circuit 14. The use of a plurality of amplifiers has the advantage that it reduces the gain required of any one amplifier and hence tends to increase the stability of the amplifiers. Also the amplitude level of the recirculating carrier wave does not vary as much around the loop, thus minimizing stray feedback from one part of the loop to another.

Limiters 20 and 22 represent means for stabilizing the amplitude of the recirculating carrier wave at the appropriate value. One limiter in the loop would be sufficient to stabilize the amplitude of the recirculating carrier wave. However the design of adder 14 and phase deviator 10 are simplified if the carrier waves supplied thereto are at a preselected fixed amplitude. It will be seen that if amplifiers 16 and 18 have a sufficiently high gain, the amplitude gain of the recirculating loop will be held at unity by limiters 20 and 22.

The loop just described will oscillate at a frequency at which the total loop delay, which comprises principally the delay provided by delay line 12, is equal to an integral number of cycles of the recirculating carrier wave. The bandpass nature of the amplifiers 16 and 18 and the other elements of the loop causes the attenuation around the loop to be less for one of the possible frequencies of oscillation than for other possible frequencies of oscillation. Therefore the loop will oscillate at this preferred frequency.

Transversal filter 23 is a circuit comprising a plurality of active and passive circuits which are arranged to shape the over-all phase and amplitude response of the loop. The filter is not essential to the operation of a sweep integrator either in accordance with the teachings of the prior art or in accordance with the teachings of the present invention. However the inclusion of such a filter generally improves the phase and amplitude response of the loop and simplifies the design of other circuits in the loop.

Phase deviator 10 provides means for introducing momentary phase shifts in the recirculating carrier wave. The phase of the recirculating carrier wave may be deviated by an amount proportional to the instantaneous amplitude of the input video pulses supplied to input 24. It is to be understood that the recirculating carrier wave will have different phases at different points in the recirculating loop owing to the time delay introduced by delay line 12. Therefore the instantaneous phase shifts introduced by deviator 10 are with reference to the zero-signal phase of the carrier wave at the input to deviator 10. In the absence of an external degeneration control a phase deviation introduced by phase deviator 10 would continue to circulate in the loop since there is nothing in the alpha loop to degenerate this phase deviation.

The means for providing a controlled decay of phase deviations present in the recirculating loop of FIG. 1 includes a reference carrier oscillator 30 and a variable gain amplifier 32. Reference carrier oscillator 30 provides a carrier wave at the reference or zero-signal phase of the recirculating carrier wave at the output of limiter 20. In a typical sweep integrator oscillator 30 may provide a carrier wave at a frequency of the order of 20 to 40 megacycles per second. The desired phase correspondence between the oscillator wave and the alpha loop carrier wave is obtained by means of a phase detector 34 which receives one input signal from the output of limiter 20 and a second input signal from reference oscillator 30. A frequency control signal is supplied by phase detector 34 to oscillator 30 by way of low pass filter 36. For reasons which will appear presently, filter 36 has an upper cut-off frequency of the order of a few hundred cycles per second. Phase detector 34 also supplies the integrated video output signal of the system to video amplifier 38.

The system shown in FIG. 1 also includes a conventional timing loop 40 coupled from the output of filter 23 to the input of amplifier 16. The function of this timing loop is to provide timing pulses to the radar transmitter thereby to cause the interpulse period of the radar system to be exactly equal to the total loop delay. Since the operation of such timing loops are well known in the sweep integrator art and since the addition or omission of the timing loop 40 does not affect the operation of the sweep integrator per se, timing loop 40 will not be described in detail.

Figure 2:
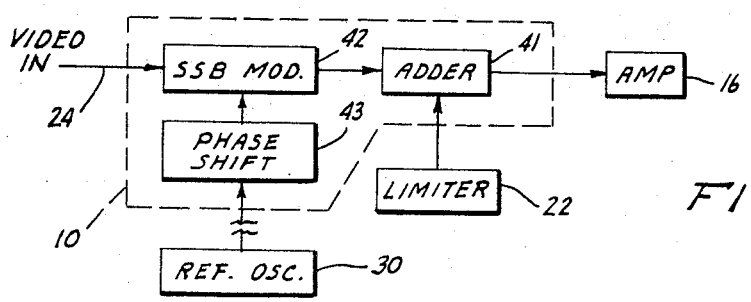
FIG. 2 is a detailed block diagram of the phase deviator of FIG. 1.

One form of phase deviator circuit which has proved to operate very satisfactorily is illustrated in block form in FIG. 2. The output of limiter 22 is supplied to one input of adder 41. A carrier wave from reference oscillator 30 is supplied to a single sideband modulator 42 through a phase shift circuit 43. Phase shift circuit 43 causes the phase of the carrier wave supplied to modulator 42 from oscillator 30 to be in phase quadrature with the reference or zero signal phase of the recirculating carrier wave supplied to adder 41 by limiter 22. Input 24 of the sweep integrator system forms the video input to modulator 42. The output of modulator 42 is supplied to a second input of adder 41. It is to be understood that the phase deviator circuit of FIG. 2 is merely an example of one type of circuit which may be employed in the system of FIG. 1 in that the invention is not to be limited to this particular type of phase deviator circuit.

Figure 3:
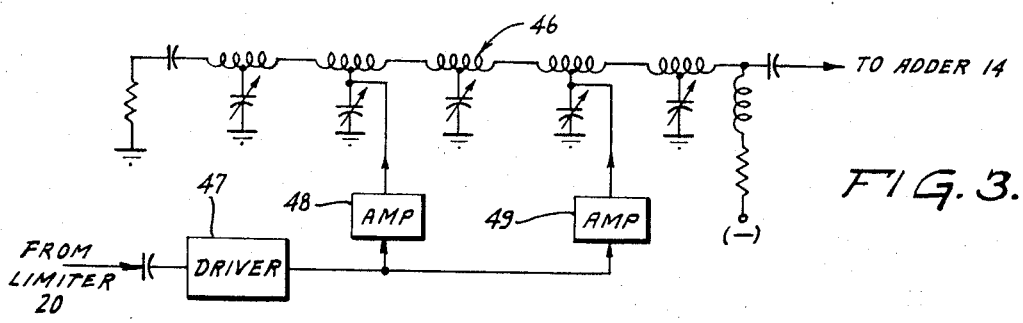
FIG. 3 is a diagram partially in block form of a transversal filter of the type employed in the system of FIG. 1.

A transversal filter of the type employed as filter 23 of FIG. 1 is shown in more detail in FIG. 3. The transversal filter comprises an adjustable tapped delay line 46 which has a delay time that is short compared to the delay time of delay line 12. The total delay of delay line 46 is of the order of a fraction of a microsecond to a few microseconds whereas the delay time of delay line 12 is of the order of 1000 microseconds or more. The recirculating modulated carrier wave from limiter 20 is supplied through driver 47 and amplifiers 48 and 49 to two separate taps on delay line 46. The output of filter 23 is obtained from the output of delay line 46. Only two amplifiers 48 and 49 are shown in FIG. 3. In practice ten or more amplifiers, each supplying a separate tap on delay line 46, may be employed in order to provide the desired shaping of the phase and amplitude response of the loop. One preferred embodiment of the invention employs thirteen amplifiers connected to a twenty-six section delay line. Filter 23 may take forms different from the one shown in FIG. 3. As noted above, filter 23 may be omitted entirely from the system of FIG. 1. Therefore the invention is not to be limited by the showing of FIG. 3.

A typical phase detector circuit which may be employed as detector circuit 34 is shown in detail in FIG. 4. The carrier wave from oscillator 30 is supplied to the primary winding 52 of a transformer which also includes a center tapped secondary winding 54. Secondary winding 54 is tuned by a capacitor 55. The recirculating modulated carrier wave from limiter 20 is supplied to the center tap of winding 54. The two end terminals of winding 54 supply two oppositely poled diode detectors 56 and 57. A second terminal of each of detector elements 56 and 57 is connected to the input of a filter 58 which passes only the video frequency components of the detected signal. Inductor 59 provides a return tap from filter 58 to the center tap of secondary 54 for the diode detectors 56 and 57. Filter 58 supplies signals to low pass filter 36 and video amplifier 38 of FIG. 1.

The other circuits which make up the system of FIG. 1 are believed to be so well known that no further description of these circuits is required.

The system of FIG. 1 operates in the following manner. The alpha loop of the system has a gain greater than unity for signals having an amplitude less than the limiting level of limiters 20 and 22. The loop gain is unity for signals which equal or exceed the limiting levels of limiters 20 and 22. Owing to the bandpass characteristics of the delay line 12, amplifiers 16, 18 and 19 and other circuit elements in the loop, the loop will have a natural period of oscillation at a frequency of several megacycles, for example 30 megacycles. Oscillations at this frequency may be initiated by random noise signals in the loop. However it has been found in prior art systems that the initiation of loop oscillations in this fashion is often relatively slow. Therefore, in the present invention, reference oscillator 30 is caused to have a natural frequency of oscillation approximately equal to the natural frequency of the recirculating loop. The signal from oscillator 30 is supplied to the alpha loop by way of adder 14 and thus causes a relatively rapid build up of the carrier wave in the alpha loop at a frequency near the natural oscillation frequency of the loop.

The phase and frequency of the recirculating signal of the alpha loop and the signal from reference oscillator 30 are compared in phase detector 34. Phase detector 34 supplies a control signal to oscillator 30 to servo the phase of the carrier wave from oscillator 30 to the phase of the recirculating carrier wave of the alpha loop. The actual control of the phase and frequency of the carrier wave from oscillator 30 may be accomplished by any convenient means, for example a signal controlled variable reactance circuit in shunt with the oscillator tank circuit. Filter 36 passes only the average or direct current component of the error signal and excludes the video components which are supplied by detector 34. In practice this filter may have an upper cut-off frequency of 500 cycles. Thus low pass filter 36 insures that oscillator 30 will be locked to the average phase of the recirculating carrier wave and will not follow the momentary phase deviations employed to represent the presence of a stored signal.

In explaining the operation of the system of FIG. 1 it is convenient to treat the integration in the alpha loop separately from the degeneration produced by circuits 14, 30 and 32. A reasonably accurate understanding of the operation of a sweep integrator can be obtained by considering separately the effects of these two functions and then superimposing these effects to obtain the overall effect on the stored signals. However it should be kept in mind that in a sweep integrator both integration and degeneration occur simultaneously.

Let it be assumed that the alpha loop is oscillating at the frequency determined by the loop delay and the passbands of the circuit making up the loop and that there is no phase deviation of the carrier wave present in the alpha loop. Let it be assumed further that the signal supplied to viedo input 24 comprises a series of regularly recurring pulses which are represented by the pulses 62a–62d in waveform B of FIG. 6, a second series of pulses having the same repetition frequency but lesser amplitude than pulses 62a–62d as represented by the pulses 64a–64c in waveform B of FIG. 6 and a single, non-recurring pulse which is represented by pulse 66 in FIG. 6.

The application of the unmodulated carrier wave 61 and the video pulses 62a, 64a and 66 to phase deviator 10 causes the carrier wave from phase deviator 10 to be shifted in phase as represented by pulses 70a, 71a and 72a of waveform C of FIG. 6. In the phase deviator of FIG. 2 this is accomplished by adding to the unmodulated carrier wave supplied by limiter 22 a quadrature phased carrier wave of the same frequency and having instantaneous amplitudes proportional to the amplitudes of corresponding input vedio pulses. This quadrature phase carrier wave is supplied by modulator 42. The addition takes place in adder 41. The phase deviations which appear at the output of deviator 10 during time interval I of FIG. 6 will appear at the input of deviator 10 as phase deviations 70b, 71b and 72b during interval II. The phase deviation produced by pulse 62b will add to the simultaneously occurring phase deviation 70b to produce the phase deviation 76a in waveform C. Similarly, pulse 64b will increase the deviation represented by pulse 71b to produce the greater deviation 77a. Since there is no video input corresponding to deviation 72b the latter will appear unchanged in the output of deviator 10.

In the absence of any degeneration, the phase deviation corresponding to the repetitive pulses will continue to build up in the recirculating loop as shown at time intervals III and IV of waveform C in FIG. 6. The means just described for introducing the signals into the alpha loop are similar to the means employed in prior art phase modulated sweep intergrators.

The present sweep integrator differs from prior art sweep integrators in the manner in which the degeneration of the stored intelligence is accomplished. In prior art sweep integrators the phase deviations represented by waveform C of FIG. 6 are detected. The resultant video signals are inverted in phase, attenuated and then combined with the input signals of waveform B. Equilibrium is reached when the amplitude of the degenerative video pulses equals the amplitude of the correspondnig input pulses.

In the present invention, as represented by the block diagram of FIG. 1, the necessary degeneration is accomplished by linearly adding a carrier wave at reference phase to the recirculating modulated carrier wave of the alpha loop. This is accomplished in adder 14.

Figure 5:
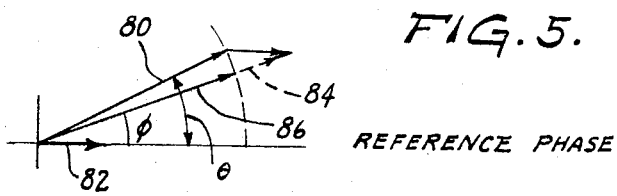
FIG. 5 is a vector diagram which is illustrative of the operation of the system of FIG. 1.

FIG. 5 is a vector diagram which illustrates the effect of the addition of a carrier wave component at reference phase. Vector 80 represents the recirculating modulated carrier wave at the input to adder 14 at one particular instant. At the instant chosen for illustration in FIG. 5 vector 80 is at a phase angle of $\theta$ degrees with respect to the reference phase. Vector 82 represents the carrier wave component at reference phase which is supplied by oscillator 30 and variable gain amplifier 32. The resultant vector 84, which corresponds to the sum of vectors 80 and 82, represents the output signal from adder 14. The amplitude change introduced by vector 82 is removed by limiter 22 leaving the vector 86. It will be seen from FIG. 5 that vector 86 has a phase deviation $\phi$ which is less than $\theta$. Therefore the addition of the unmodulated carrier at reference phase has resulted in a degeneration of the phase deviation present in the phase modulated recirculating carrier wave of the alpha loop.

It will be seen that the amount of degeneration produced by a given vector 82 increases as the phase angle $\theta$ increases. This is desirable since it results in an approximately exponential decay of signals stored within the integrator. Further it makes the phase deviation corresponding to repetitive pulses self-limiting. It can be seen from FIG. 5 that minor variations in the phase of the signal represented by vector 82 from the reference phase position will not seriously degrade the performance of the system. However the deviation of vector 82 from the reference phase position should be kept small compared to the phase shift which will provide a signal of significant amplitude to video amplifier 38.

FIG. 7 is a waveform similar to waveform C of FIG. 6 and shows the effect of the degeneration of pulses of various amplitudes which are not reinforced by further input signals. The light outlines in the pulse repetition period II of FIG. 7 correspond to the original amplitudes of the pulses. It will be seen that the larger pulses 90 and 92 are attenuated by a greater amount (although by approximately the same percentage) than the smaller pulses 94 and 96.

The effect of a degenerative circuit associated with the alpha loop which is being supplied with a repetitive series of pulses is to cause the phase deviations in the alpha loop to build up to the point where the additional deviation produced by an input pulse is just equal to the degeneration introduced in one passage around the recirculating loop. Signals such as pulse 72b of FIG. 6 are gradually attenuated by the degenerative actions since they are not reniforced by further input signals. Signals resulting originally from a repetitive pulse series are similarly attenuated once the repetitive pulses of that pulse series disappear from the input of the phase deviator. In a radar system this might occur as a result of a change in position of the target or of the system antenna.

Turning once again to the vector diagram of FIG. 5 it will be seen that the amount of degeneration produced by vector 82 is proportional to the amplitude of this vector. Therefore the effective over-all intelligence feedback factor for the sweep integrator may be controlled by controlling the amplitude of the reference phase carrier wave supplied to adder 14. Variable gain amplifier 32 provides a convenient means for controlling the amplitude of the reference phase carrier wave supplied to adder circuit 14. However, other means, such as an adjustable signal attenuator, may be employed instead. Since amplifier 32, or any signal amplitude control device used in place thereof, need pass only the unmodulated carrier wave supplied by oscillator 30, it may be made relatively narrow band and thus exclude from the alpha loop unwanted harmonics or other distortion components which may be present in the degenerative circuit.

The manner in which the gain of amplifier 32 is changed will depend largely upon the processing to be accomplished with the sweep integrator. In a system employing a scanning antenna the gain may be changed in synchronism with the rotation of the antenna so that targets at different azimuths are integrated over longer or shorter periods. As an alternative, the gain of amplifier 32 may be varied in a selected manner during each radar repetition period so that signals at different ranges are integrated differently. In other situations the gain may be varied only infrequently to compensate for changes in the type of terrain being scanned and/or the conditions of the atmosphere, etc.

The integrated output signal is obtained from phase detector 34. Video amplifier 38 represents generically a utilization circuit for the integrated video output signal of the sweep integrator.

FIG. 1 illustrates what is at present believed to be the preferred means for generating a carrier wave at reference phase for addition to the alpha loop. However it lies within the scope of the invention to provide other means for generating or deriving this signal of reference phase. FIG. 8 illustrates one alternative means for deriving a component at the reference phase from the alpha loop. In FIG. 8 the alpha loop is identical to the alpha loop of FIG. 1 except that the transversal filter 23 has been omitted for the sake of simplifying the drawing. Timing loop 40 has been omitted for the same reason. Circuits in FIG. 8 corresponding to like circuits in FIG. 1 have been identified by the same reference numeral. Variable gain amplifier 32 of FIG. 8 corresponds to the similarly numbered circuit of FIG. 1. Oscillator 30 and phase detector 34 of FIG. 1 have been replaced by a narrow band filter 100. Filter 100 has a passband which is centered at the natural resonant frequency of the alpha loop. Filter 100 preferably has a passband of only a few hundred cycles so that it passes only the average carrier frequency of the recirculating modulated carrier wave and excludes all sideband components which represents stored intelligence. In the embodiment of FIG. 8 the alpha loop is entirely self-regenerating since there is no oscillator to prime the oscillations of this loop. A system of FIG. 8 requires somewhat simpler circuitry than the system of FIG. 1 but it has the practical disadvantage that it is difficult to adjust the very narrow passband of filter 100 to the average carrier frequency of the alpha loop.

An output signal is obtained from the system of FIG. 8 by means of a phase detector circuit 102 which receives a modulated carrier wave from the output of limiter 22 and a reference carrier wave from filter 100 by way of phase control circuit 104. Phase control circuit 104 adjusts the phase of the carrier wave supplied to detector 102 from filter 100 so that it is substantially in phase with the reference phase at the output of limiter 22. The embodiment of FIG. 8 illustrates that the output signal may be taken from any convenient place in the recirculating loop.

In the systems of FIGS. 1 and 8 the recirculating carrier wave has the same frequency at all points in the recirculating loop. This is not essential to the operation of the present invention. The recirculating carrier wave may be heterodyned up in frequency before being supplied to delay line 12, for example, to put it within the passband of the delay line, and then hereroydned down in frequency at the output of delay line 12 to permit the remainder of the loop to operate at some convenient lower frequency. Preferably the same source of local oscillations should be employed for both heterodyning operations in order that the desired phase and frequency relationships are maintained. Similar heterodyning operations may be employed at other points in the alpha loop if desired.

The input signals to the systems of FIGS. 1 and 8 have been assumed to be video pulses. However it is to be understood that the input signal may take other forms. For example, if the input signals comprise an amplitude modulated carrier wave which has a carrier frequency exactly equal to the average frequency of the recirculating signal of the alpha loop, the modulator 42 and phase shift circuit 43 of FIG. 2 may be omitted and the input signal supplied directly to one input of adder 41.

While the invention has been described with reference to the preferred embodiments thereof, it will be apparent that various modifications and other embodiments thereof will occur to those skilled in the art within the scope of the invention. Accordingly I desire the scope of my invention to be limited only by the appended claims.

What is claimed is:

1. A sweep integrator circuit comprising a delay line, means coupling the output of said delay line to its input to form a recirculatory loop having a gain greater than unity for signals within a certain frequency band and below a certain amplitude level at a selected point in said loop, whereby a carrier wave having a frequency within said band at said selected point is caused to circulate in said loop, said last-mentioned means including signal responsive means for modulating the phase of said carrier wave circulating in said loop, means for supplying the signal to be integrated to said phase modulating means, and means associated with said loop for adding a carrier wave, at a reference phase of the modulated carrier wave in said loop, to the modulated carrier wave circulating in said loop.

2. A sweep integrator circuit comprising a delay line, means coupling the output of said delay line to its input to form a recirculatory loop having a gain greater than unity for signals within a certain frequency band and below a certain amplitude level at a certain point in said loop, whereby a carrier wave having a frequency within said band at said certain point is caused to circulate in said loop, said last-mentioned means including signal responsive means for modulating the phase of said carrier wave circulating in said loop, means for supplying the signal to be integrated to said phase modulating means, means connected to said loop for deriving a carrier frequency wave having a frequency and phase corresponding to the frequency and reference phase at a selected point in said loop of the carrier wave circulating in said loop, and means for adding said derived carrier frequency wave to said circulating modulated carrier wave at said selected point in said loop.

3. A sweep integrator in accordance with claim 2 wherein said means for adding said derived carrier frequency wave to said circulating carrier wave in said loop includes means for varying the amplitude of the derived carrier frequency wave added to said circulating signal.

4. A sweep integrator in accordance with claim 2 wherein said means for adding said derived carrier frequency wave to said circulating carrier wave in said loop includes variable gain amplifier means for varying the amplitude of the derived carrier frequency wave added to said circulating carrier wave.

5. A sweep integrator circuit comprising a delay line, phase deviator means, signal adder means and means coupling said delay line, said phase deviator means and said adder means in a recirculatory loop, said loop having a gain greater than unity for signals within a certain frequency band and below a certain amplitude level at a certain point in said loop whereby a first carrier wave having a frequency within said certain frequency band is caused to circulate in said loop, means for supplying signals to be integrated to said phase deviator means to control the phase deviations of said first carrier wave circulating in said loop, means coupled to said loop for providing a second carrier wave having a frequency and phase corresponding to the frequency and reference phase of said first carrier wave at said signal adder means, and means coupling the output of said last-mentioned means to a signal input of said signal adder means.

6. A sweep integrator circuit comprising a delay line, phase deviator means, signal adder means and means coupling said delay line, said phase deviator means and said signal adder means in a recirculatory loop, said loop having a gain greater than unity for signals within a certain frequency band and below a certain amplitude level at a certain point in said loop whereby a first carrier wave having a frequency within said certain frequency band is caused to circulate in said loop, means for supplying signals to be integrated to said phase deviator means to control the phase deviations of said first carrier wave circulating in said loop, a reference oscillator circuit for providing a second carrier wave having a frequency equal to the frequency at said signal adder means of said first carrier wave, phase detector means coupled to said loop and said reference oscillator circuit for causing the phase of said second carrier wave supplied by said oscillator circuit to correspond to the reference phase at said signal adder means of said first carrier wave, means for supplying the output signal of said oscillator means to an input of said signal adder means, and means for deriving an output signal from said phase detector means.

7. A sweep integrator circuit in accordance with claim 6 wherein said means for supplying the output signal of said ocillator circuit to said signal adder means includes means for controlling the amplitude of the second carrier wave supplied to said input of said signal adder means.

8. A sweep integrator circuit in accordance with claim 6 wherein said means for supplying the output signal of said oscillator circuit to said signal adder means includes variable gain amplifier means for controlling the amplitude of the second carrier wave supplied to said input of said signal adder means by said reference oscillator circuit.

9. A sweep integrator circuit in accordance with claim 6 wherein the coupling between said phase detector means and said reference oscillator circuit includes a low pass filter means coupling an output of said phase detector means to a phase control input of said oscillator circuit.

10. A sweep integrator circuit comprising a delay line, phase deviator means, signal adder means and means coupling said delay line, said phase deviator means and said signal adder means in a regenerative loop, said loop having a gain greater than unity for signals within a certain frequency band and below a certain amplitude level at a certain point in said loop whereby a first carrier wave having a frequency within said certain frequency band is caused to circulate in said loop, means for supplying signals to be integrated to said phase deviator means to control the phase deviations of said carrier wave circulating in said loop, a narrow band filter coupled to said loop, said filter having a passband centered at the average frequency of the phase deviated carrier wave circulating in said loop, means coupling the output of said filter means to an input of said signal adder means, and phase detector means coupled to said loop for deriving an output signal from said loop.

No references cited.

RICHARD A. FARLEY, *Primary Examiner.*

DANIEL C. KAUFMAN, *Assistant Examiner.*

U.S. Cl. X.R.

328—139, 165